(12) United States Patent
Srinivasan et al.

(10) Patent No.: US 9,251,189 B2
(45) Date of Patent: *Feb. 2, 2016

(54) UPDATE OF DATA STRUCTURE CONFIGURED TO STORE METADATA ASSOCIATED WITH A DATABASE SYSTEM

(71) Applicant: NetApp, Inc., Sunnyvale, CA (US)

(72) Inventors: Badrinarayanan Srinivasan, Chennai (IN); Vrishali Thorat, Bangalore (IN); Shyamlapriya Pudur Raamamurthy, Chennai (IN)

(73) Assignee: NETAPP, INC., Sunnyvale, CA (US)

( * ) Notice: Subject to any disclaimer, the term of this patent is extended or adjusted under 35 U.S.C. 154(b) by 125 days.

This patent is subject to a terminal disclaimer.

(21) Appl. No.: 13/897,645

(22) Filed: May 20, 2013

(65) Prior Publication Data

US 2013/0254161 A1    Sep. 26, 2013

Related U.S. Application Data

(63) Continuation of application No. 13/092,071, filed on Apr. 21, 2011, now Pat. No. 8,452,817.

(51) Int. Cl.
*G06F 17/30* (2006.01)

(52) U.S. Cl.
CPC .... *G06F 17/30312* (2013.01); *G06F 17/30079* (2013.01)

(58) Field of Classification Search
None
See application file for complete search history.

(56) References Cited

U.S. PATENT DOCUMENTS

| | | | |
|---|---|---|---|
| 6,327,584 B1 | 12/2001 | Xian et al. | |
| 7,225,411 B1 * | 5/2007 | Stoner et al. | 715/760 |
| 7,613,815 B1 | 11/2009 | Prakash et al. | |
| 7,818,740 B2 | 10/2010 | Bankston et al. | |
| 7,890,453 B2 | 2/2011 | Dick et al. | |
| 2005/0144166 A1 * | 6/2005 | Chapus et al. | 707/6 |
| 2005/0234987 A1 | 10/2005 | Cyphers | |
| 2006/0288056 A1 | 12/2006 | Yamakawa et al. | |

OTHER PUBLICATIONS

Office Action mailed Oct. 4, 2012, for related U.S. Appl. No. 13/092,071, filed Apr. 21, 2011, 25 Pages.
Notice of Allowance mailed Jan. 18, 2013, for related U.S. Appl. No. 13/092,071, filed Apr. 21, 2011, 20 Pages.

\* cited by examiner

*Primary Examiner* — Bai D. Vu
(74) *Attorney, Agent, or Firm* — Klein, O'Neill & Singh, LLP

(57) ABSTRACT

Example embodiments provide various techniques for updating an old data structure configured to store metadata associated with database systems. In this method, a temporary data structure is created. Additionally, a new data structure representing an update of the old data structure is created. The metadata from the old data structure are copied to the temporary data structure, and the temporary data structure is transformed to match the new data structure. The metadata from the transformed temporary data structure are copied to the new data structure. The transformation of the temporary data structure instead of the old data structure may enable an application that is not being updated to be operational and to access the old data structure during the update. After the metadata is copied to the new data structure, a new version of the application is then able to access the new data structure.

20 Claims, 15 Drawing Sheets

UPDATE OF DATA STRUCTURE CONFIGURED TO STORE METADATA ASSOCIATED WITH A DATABASE SYSTEM

RELATED APPLICATIONS

This application is a Continuation of U.S. patent application Ser. No. 13/092,071, filed Apr. 21, 2011; the aforementioned priority application being hereby incorporated by reference in its entirety for all purposes.

FIELD

The present disclosure relates generally to database systems. In an example embodiment, the disclosure relates to the update of data structures configured to store metadata.

BACKGROUND

Many database systems include applications that provide tools for database administrators to perform, for example, data management, scheduling and creation of database backups, and restoration of data from these backups in the event of data loss. These applications create metadata about the database being managed and store these metadata in a repository. For example, an application may record in the repository such metadata as when a backup was created and which files were backed up. A single repository can typically hold the metadata of multiple applications hosted on multiple database systems.

When the applications hosted on multiple database systems are updated to a newer version, the repository that stores the metadata also needs to be updated. However, all applications need to be suspended or stopped from running in order to update the repository and applications. One typical reason that the applications need to be suspended is because the repository cannot be modified or deleted when accessed by the applications. However, the suspensions of the applications may create downtime for data access. In today's data-driven enterprise, business-critical databases need to be operational around the clock to facilitate decision making, e-commerce, and a myriad of other business processes.

SUMMARY

Example embodiments provide various techniques for updating one or more data structures that are configured to store metadata associated with database systems. When a number of storage management applications are updated to a new version, the data structures that store the metadata (or "old" data structures) used by all the storage management applications also need to be updated. Instead of directly modifying such old data structures during the update, copies of the data structures (or "temporary" data structures) are created, and metadata from the old data structures are copied to these temporary data structures. These temporary data structures with the metadata are then transformed to match new data structures that are updated versions of the old data structures.

After the transformation, the metadata are then copied from the temporary data structures to the new data structures, which are then accessible by the new version of the storage management application. During this update process, the old data structures may continue to be accessible by other storage management applications that are not being updated because all the modifications are applied to the temporary data structures, but not to the old data structures. The only storage management applications that are to be suspended are the number of applications being updated to a new version. As a result, the update process can be applied to a number of storage management applications at a time while leaving the non-updated storage management applications operational during the update. Such an update process can minimize downtime or disruption to data access operations.

BRIEF DESCRIPTION OF DRAWINGS

The present disclosure is illustrated by way of example and not limitation in the figures of the accompanying drawings, in which like references indicate similar elements and in which.

DESCRIPTION OF EXAMPLE EMBODIMENTS

The description that follows includes illustrative systems, methods, techniques, instruction sequences, and computing machine program products that embody the present invention. In the following description, for purposes of explanation, numerous specific details are set forth in order to provide an understanding of various embodiments of the inventive subject matter. It will be evident, however, to one skilled in the art that embodiments of the inventive subject matter may be practiced without these specific details. In general, well-known instruction instances, protocols, structures and techniques have not been shown in detail.

Figure 1:
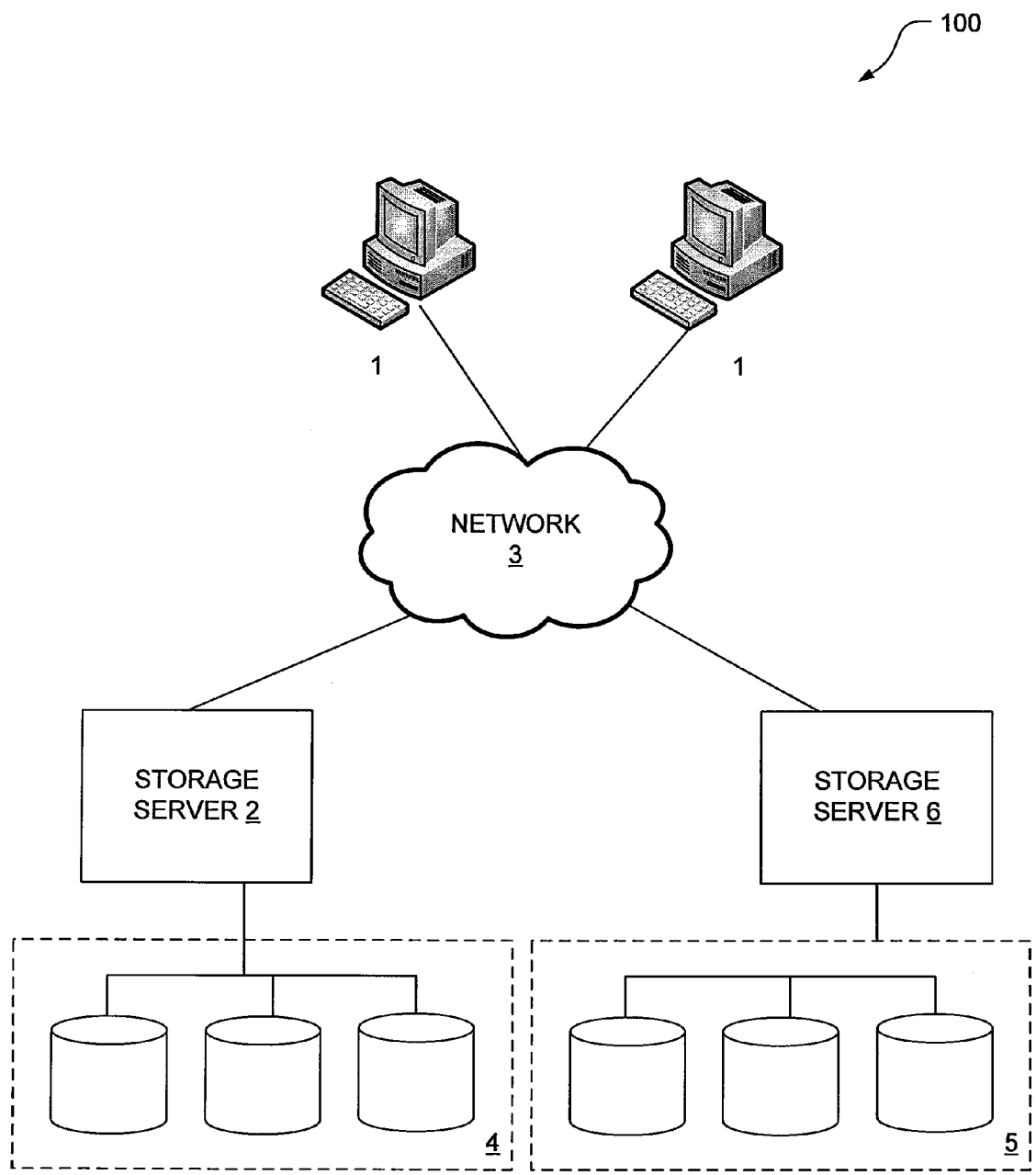
FIG. 1 depicts a block diagram of an example embodiment of a storage system.

FIG. 1 depicts a block diagram of an example embodiment of a storage system 100. Generally, the storage system 100 operates on behalf of client processing systems ("clients") 1 to store and manage shared files or other units of data (e.g., blocks) in a set of mass storage devices. In storage system 100, a number of clients 1 are in communication with storage servers 2 and 6 through network 3, such as a local area network (LAN), a wide area network (WAN), or a storage area network (SAN). The storage servers 2 and 6 are in communication with storage subsystems 4 and 5, which are comprised of mass storage devices.

Each of the clients 1 may be, for example, a conventional personal computer (PC), a workstation, a smart phone, or other processing systems. The storage servers 2 and 6 manage the storage subsystems 4 and 5, respectively, and receive and respond to various read and write requests from clients 1, directed to data stored in, or to be stored in, the storage subsystems 4 and 5. The mass storage devices in the storage subsystems 4 and 5 may be, for example, conventional magnetic disks, flash memory, optical disks such as CD-ROM or DVD, magneto-optical (MO) storage, or any other type of non-volatile storage devices. The mass storage devices may be organized into one or more volumes of Redundant Array of Inexpensive Disks (RAID).

In addition to the example depicted in FIG. 1, the storage system 100 can have many other different configurations. For example, in an alternative configuration, the storage server 6 may serve a separate set of clients coupled to the storage server 6. In another configuration, some of the mass storage devices included in the storage subsystem 5 may be configured to operate under the direct control of the storage server 2 and vice versa, where some of mass storage devices included in the storage subsystem 4 may be configured to operate under the direct control of storage server 6 (e.g., a cluster-failover configuration). In other configurations, one or more additional storage servers may be coupled to the source storage server 2 and/or to the storage server 6.

Figure 2:
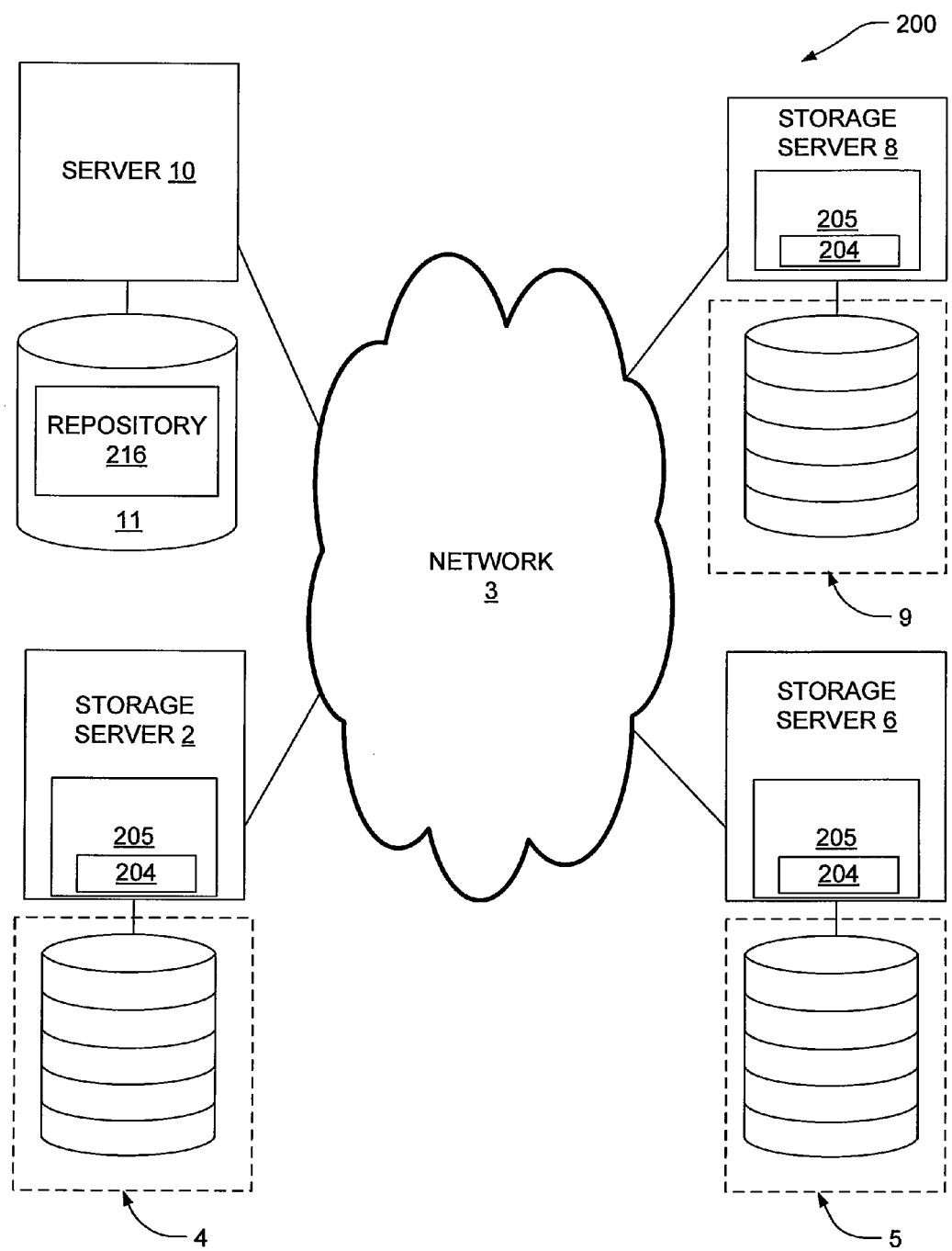
FIG. 2 depicts a block diagram of a more detailed example of a storage system, in accordance with an embodiment.

FIG. 2 depicts a block diagram of a more detailed example of a storage system 200, in accordance with an embodiment. This storage system 200 includes storage servers 2, 6, and, 8 in communication with their respective storage subsystems 4, 5, and 9. Additionally included in the storage system 200 is a server 10 and a storage 11 associated with the server 10. The server 10 is in communication with all three storage servers 2, 6, and 8 by way of network 3. Alternatively, the server 10 can be directly connected to each storage server 2, 6, or 8 (e.g., direct cable connection).

The server 10 can be a storage server or can be a specialized server specifically configured for central management. For example, any storage server 2, 6, or 8 connected to network 3 can also function as a server 10. Thus, which storage server 2, 6, or 8 is the server 10 is relative in such an example. That is, a server can function as a central management or storage for some purposes and function like a storage server for other purposes. The server 10 can be any suitable processing device connected to the network 3 and can be implemented using software running on a variety of operating systems.

In this example, each storage server 2, 6, or 8 is adapted to host or run a storage management application 204 that generally provides management for enterprise storage and content delivery environments. The storage management application 204 is installed on every host (e.g., storage server 2, 6, and 8) that has a database system 205. As used herein, a "database system" refers to one or more data structures and a set of computer applications (e.g., storage management application 204) that controls the creation, maintenance, and the use of these data structures. Particularly, the storage management application 204 can provide users with an automated tool to manage backups, restoration, and recovery of production data structures. As an example, the storage management application 204 can use data protection policies set up by users to standardize and automate data protection. It should be appreciated that a "data structure," as used herein, provides context for the organization of data. Examples of data structures include database tables, arrays, linked lists, and other data structures.

Each storage management application 204 uses a central repository 216 to store its metadata. In the example depicted in FIG. 2, the repository 216 resides in the storage 11 associated with the server 10 and provides a central storage to the various storage management applications 204 hosted on different storage servers 2, 6, and 8. Metadata, as used herein, refer to a variety of data about data associated with a database system. For example, metadata can include a time when a backup was created. In another example, metadata can include the file names of files that were backed up. In yet another example, metadata can include data identifying whether a clone was created using the backup. A credential used to access a data structure can be another example of metadata. In still another example, metadata can include data about operations performed on one or more data structures.

Figure 3:
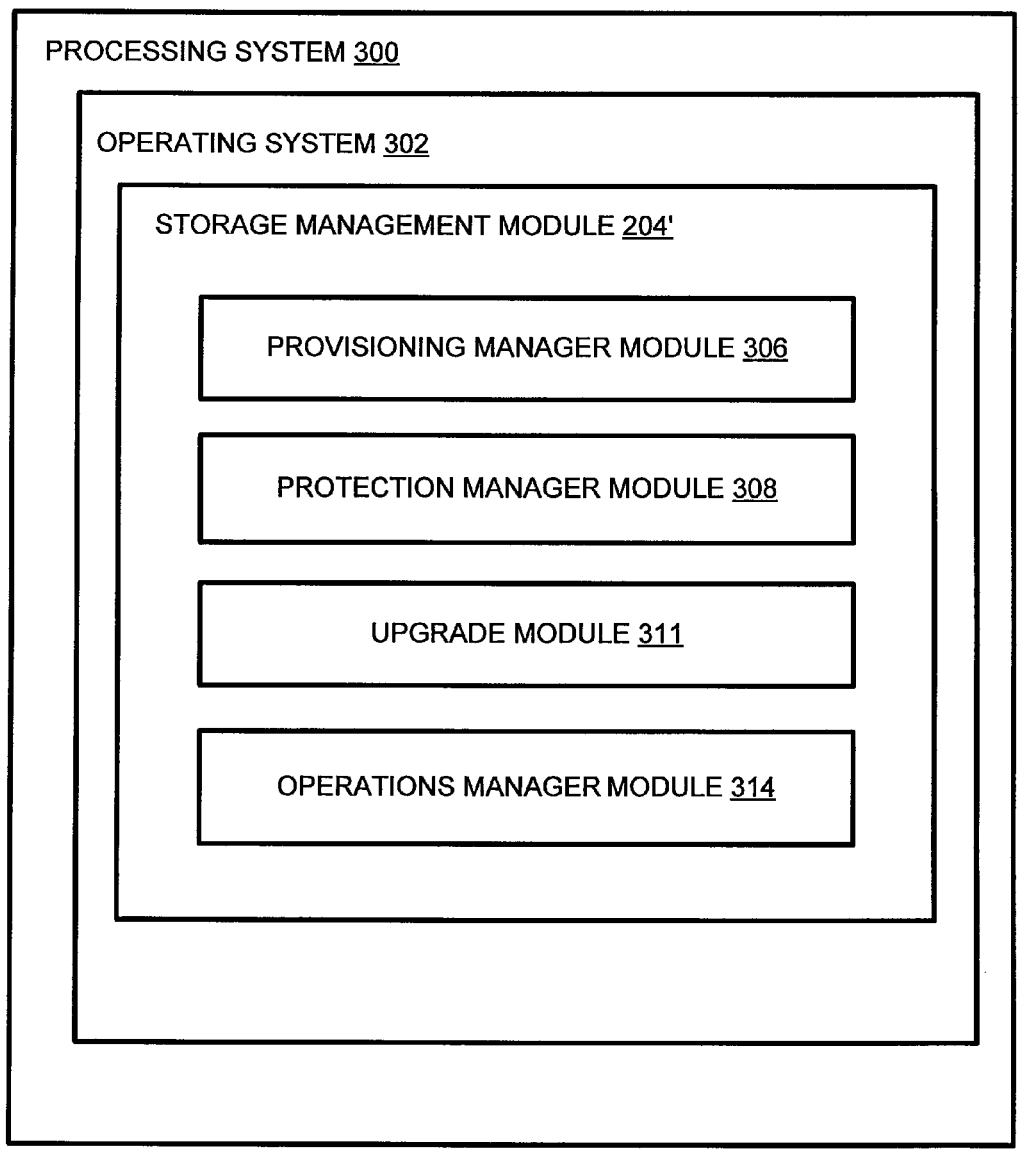
FIG. 3 depicts a high-level block diagram of a machine in the example form of a processing system within which may be executed a set of instructions for causing the machine to perform any one or more of the methodologies discussed herein.

FIG. 3 depicts a high-level block diagram of a machine in the example form of a processing system 300 within which may be executed a set of instructions for causing the machine to perform any one or more of the methodologies discussed herein. The processing system 300 may be deployed in the form of, for example, a storage server (e.g., storage server 2, 6, or 8 depicted in FIG. 2), a personal computer, a tablet personal computer, a laptop computer, or a variety of other processing systems. In the embodiment where the processing system 300 is a storage server, the storage server may be, for example, a file server, and more particularly, a network attached storage (NAS) appliance. Alternatively, the storage server may be a server that provides clients with access to information organized as data containers, such as individual data blocks, as may be the case in a SAN. In yet another example, the storage server may be a device that provides clients with access to data at both the file level and the block level.

In the embodiment depicted in FIG. 3, the processing system 300 includes an operating system 302 and manages the other software processes and/or services executing on the processing system 300. These software processes and/or services include a storage management module 204', which may be embodied as the storage management application as described above. In this example, the storage management module 204' includes a provisioning manager module 306, a protection manager module 308, an upgrade module 311, and an operations manager module 314.

Generally, the provisioning manager module 306 provides policy-based provisioning of NAS, SAN, or secondary storage. The provisioning manager module 306 also uses a management console to provide a graphical user interface (GUI), and enables the storage management module 204' to monitor and manage storage entities. It should be appreciated that the management console can be installed and executed on one or more workstations (e.g., clients 1 of FIG. 1). The protection manager module 308 automates the discovery, provisioning, and reporting for data protection operations. The protection manager module 308 can also configure and control all different types of data backup applications hosted on, for example, storage servers. The operations manager module 314 is a client server application that delivers monitoring and management of storage systems from a single console with alerts, reports, performance tools, and configuration tools.

Additionally included in the storage management module 204' is the upgrade module 311. In general, the upgrade module 311 updates data structures that are configured to store metadata associated with one or more database systems. As an example, an update of the storage management module 204' to a newer version can also result in an update of the data structures that store the metadata. The upgrade module 311 is configured to update such data structures such that they are compatible with the new version of the storage management module 204'. As explained in detail below, the update mechanism uses one or more temporary data structures to hold the metadata. The temporary data structures are then transformed to match one or more new data structures that are compatible with the new version of the storage management module 204'. Mechanisms to roll back the changes made to the data structures are also described in detail below.

It should be appreciated that in other embodiments, the processing system 300 may include fewer, more, or different modules apart from those shown in FIG. 3. For example, in an alternate embodiment, the upgrade module 311 may be integrated within a different module, such as the operations manager module 314 or the provisioning manager module 306.

Figure 4A:
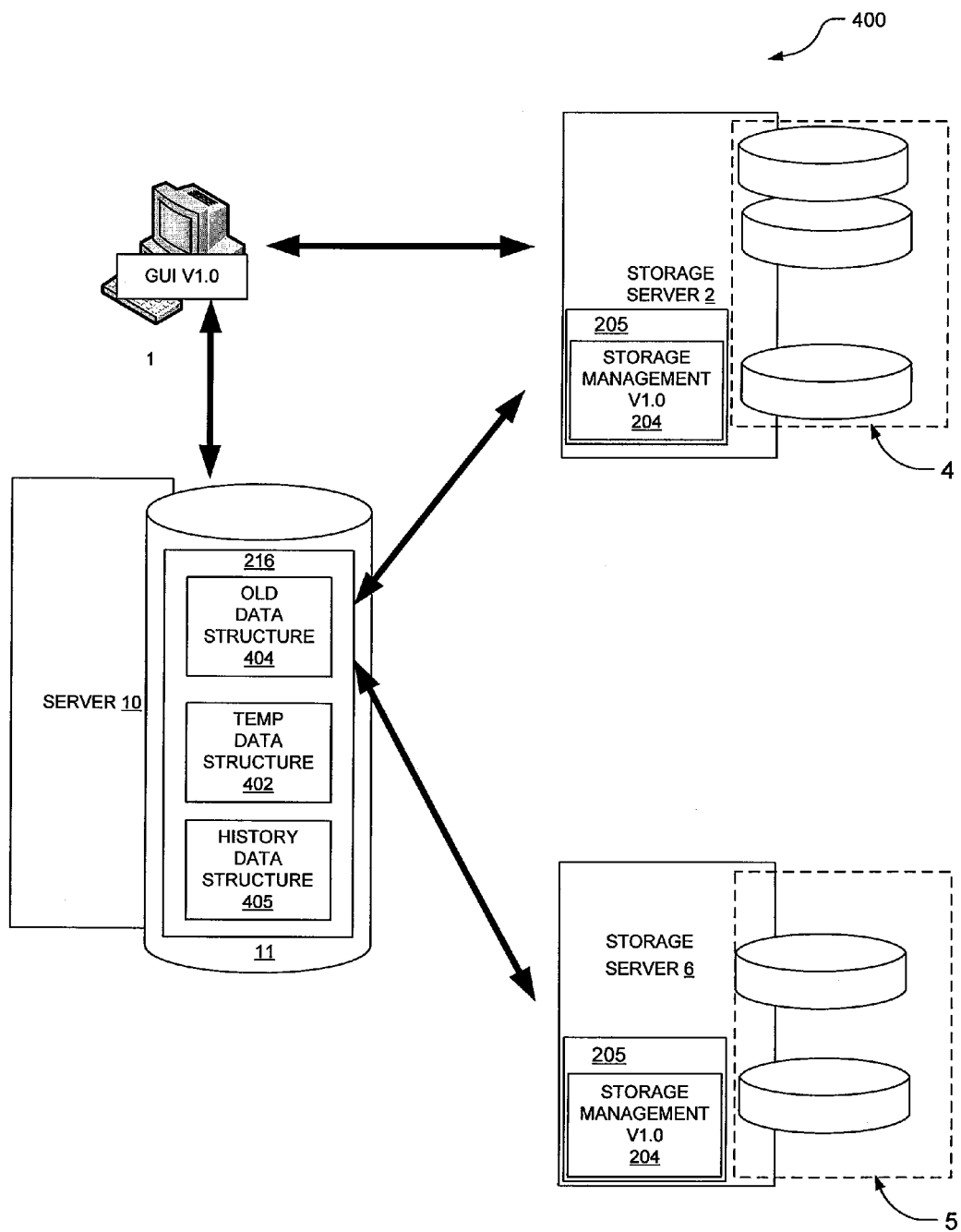
FIGS. 4A and 4B are block diagrams depicting the update of an old data structure configured to store metadata.
Figure 4B:
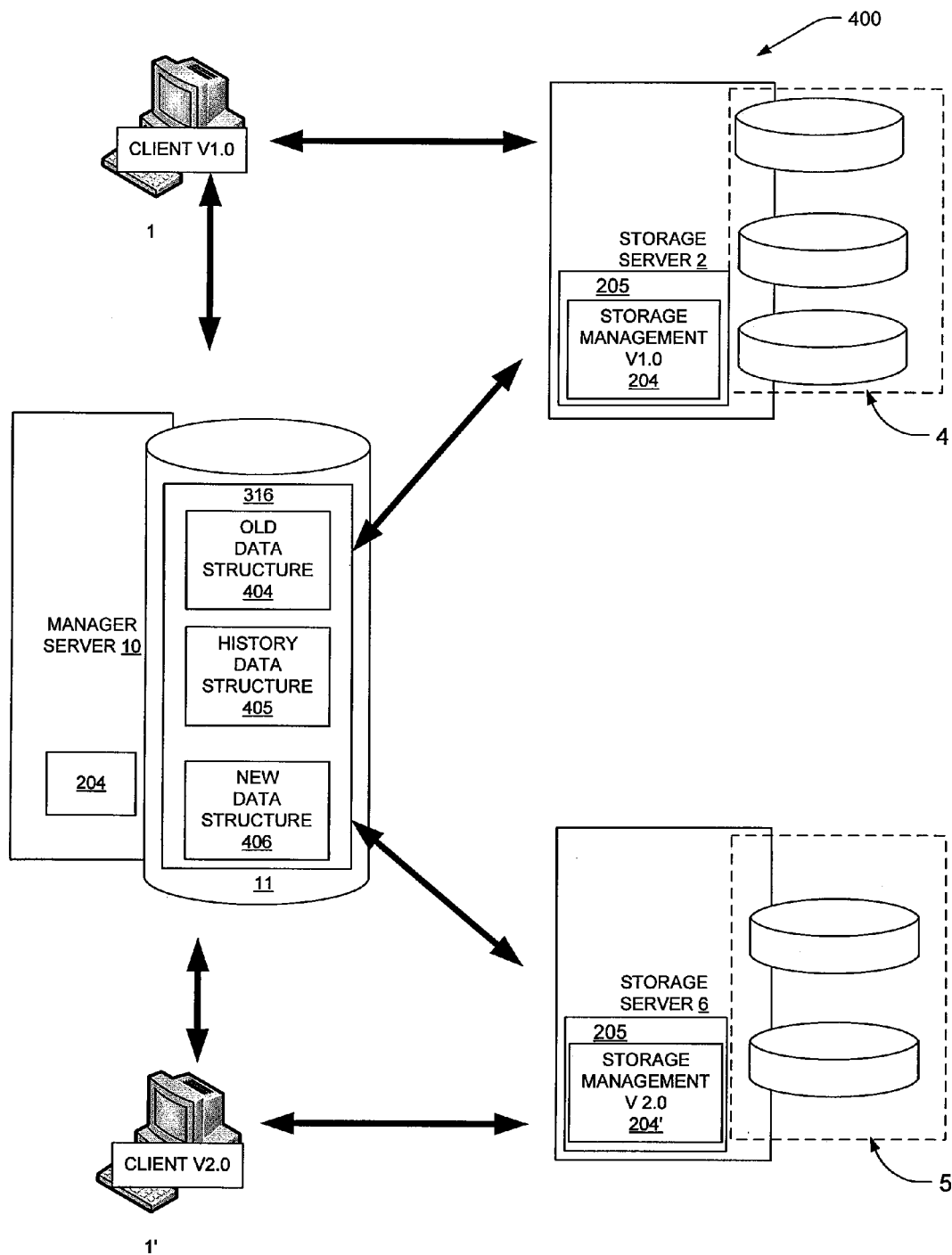

FIGS. 4A and 4B are block diagrams depicting an update of an old data structure configured to store metadata. FIG. 4A is a more detailed view of a portion of the storage system 200 depicted in FIG. 2. As depicted in FIG. 4A, this storage system 400 includes storage servers 2 and 6, server 10, and a client 1. The storage servers 2 and 6 are in communication with their respective storage subsystems 4 and 5. The server 10 has a storage 11 and is in communication with storage servers 2 and 6. In this example, the client 1 is in communication with both the storage server 2 and server 10.

As discussed above, each storage server 2 or 6 is adapted to host or run a database system and a storage management application 204. Each storage management application 204 uses the repository 216, which is stored in the storage 11, to store its metadata. In this example, the current version of the storage management applications 204 is version 1.0, and these storage management applications 204 are to be updated to a newer version 2.0. In the update of storage management applications 204, the old data structure 404 that is configured to store the metadata for all storage management applications 204 is also updated. An "old" data structure therefore refers to an existing data structure that is to be updated. For example, the update of storage management applications 204 may result in the addition, deletion, and/or modification of the old data structure 404.

Instead of having to suspend or halting execution of the database systems 205 to update the storage management applications 204, embodiments of the present invention provide mechanisms for a rolling upgrade where one storage server 2 or 6 (or database system 205) can be updated at one time. As described in more detail below, a temporary data structure 402 stored in storage 11 is created to provide increased accessibility of the metadata during the update process. Additionally, the update process can also use a history data structure 405, which is also stored in storage 11, to reverse or roll back the update.

In the example depicted in FIG. 4A, the storage management application 204 hosted on storage server 6 is to be updated to version 2.0. In the update, the storage management application 204 hosted on storage server 6 can move or copy its metadata from the old data structure 404 to the temporary data structure 402. As depicted in FIG. 4B, a new data structure 406 configured to work with version 2.0 of the storage management application 204 is also created. As used herein, a "new" data structure is an updated data structure that is configured to work with the new or updated version of an application. As described in more detail below, the temporary data structure 402 (shown in FIG. 4A) is then transformed to match the new data structure 406, and after the transformation, the metadata are moved from the temporary data structure 402 to the new data structure 406.

In reference to FIG. 4B, after the update process, the storage management application 204' hosted on the storage server 6 is updated to version 2.0. At the same time, a new data structure 406 has been created to accommodate the metadata used by version 2.0 of the storage management application 204'. However, the old data structure 404 is still in place in the repository 316 because the storage management application 204 hosted on storage server 2 has not been updated to version 2.0. As a result, version 1.0 of the storage management application 204 can continue to access metadata from the old data structure 404, which is configured to work with the old version 1.0 of the storage management application 204. A user can therefore continue to use version 1.0 of the client application executed on client 1 to access the functionalities provided by version 1.0 of the storage management application 204 even during the update to version 2.0. At the same time, version 2.0 of the storage management application 204' can also access metadata from the new data structure 406, which is configured to work with the new version 2.0 of the storage management application 204'. Accordingly, a user can also use version 2.0 of the client application executed on client 1' to access functionalities provided by version 2.0 of the storage management application 204'. After the storage server 6 is updated, the update process can be repeated for the next database system. That is, the update process can be repeated for the next storage management application 204 hosted on storage server 2.

Figure 5:
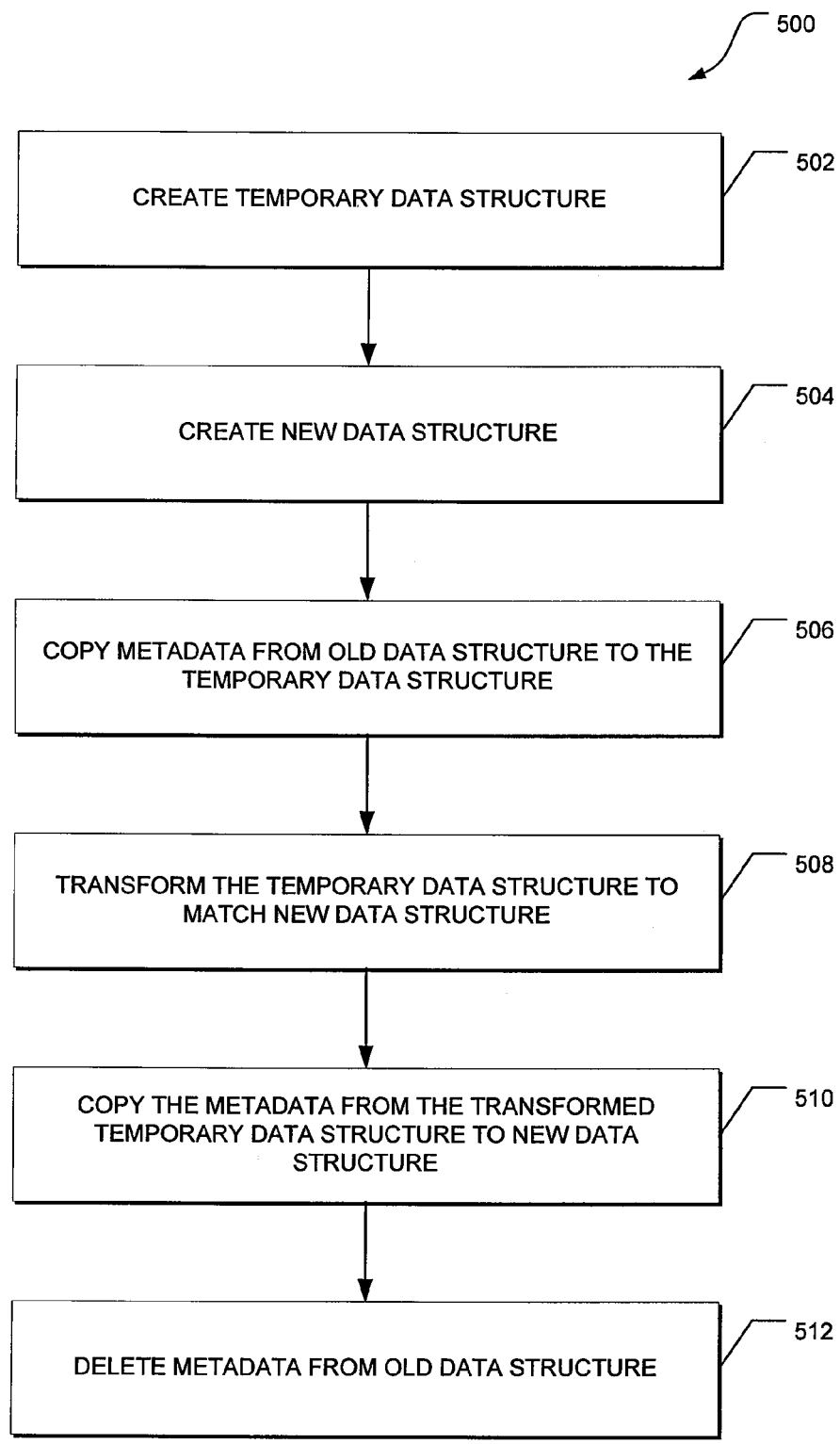
FIG. 5 depicts a flow diagram of a general overview of a method, in accordance with an embodiment, for updating an old data structure configured to store metadata associated with a database system.

FIG. 5 depicts a flow diagram of a general overview of a method 500, in accordance with an embodiment, for updating an old data structure configured to store metadata associated with a database system. In an example embodiment, the method 500 may be implemented by the upgrade module 311 and employed in the processing system 300 of FIG. 3. As depicted at 502 in FIG. 5, a temporary data structure is created. Additionally, a new data structure is created at 504. This new data structure is configured to store metadata used by a new version of the storage management application. In one embodiment, both the temporary data structure and the new data structure can be created in a centralized storage accessible by many storage management applications. For example, in reference to FIG. 2, the temporary data structure and the new data structure can be created in the same repository that includes the old data structure.

Returning to FIG. 5, after the creation of the temporary data structure, the metadata from the old data structure are copied to the temporary data structure at 506. After the data has been copied to the temporary data structure, the temporary data structure is transformed to match the new data structure at 508. To transform the temporary data structure to match the new data structure, a variety of different transformation techniques may be applied. In one example embodiment, the temporary data structure may have been created with a schema that matches the schema associated with the old data structure. A "schema" refers to an organization of data (e.g., metadata) in a data structure. As an example, a database schema is a set of formulas that specify integrity constraints imposed on the database.

However, the schema associated with the old data structure is different from the schema associated with the new data structure. Accordingly, in one embodiment, the transformation includes transforming the schema associated with the temporary data structure to match the different schema associated with the new data structure. In the transformation, a variety of different transformation rules are provided by a user, and these transformation rules generally map the old schema to the new schema. As an illustrative example, an old schema associated with a set of old data structures include three tables, namely an Employee Table, an Employer Table, and an Employment Table:

| EMPLOYEE TABLE | |
| --- | --- |
| NAME | EMPID |
| A | 1 |
| B | 2 |
| C | 3 |
| D | 4 |

| EMPLOYER TABLE | | |
| --- | --- | --- |
| ORGANIZATION_ID | ORGANIZATION_NAME | LOCATION |
| 100 | AAA | CHENNAI |
| 200 | BBB | BANGALORE |

| EMPLOYMENT TABLE | |
| --- | --- |
| EMPID | ORGANIZATION_ID |
| 1 | 100 |
| 2 | 100 |
| 3 | 200 |
| 4 | 200 |

As defined, the Employee Table includes a "NAME" column and an "EMPID" column. The Employer Table includes an "ORGANIZATION_ID" column, an "ORGANIZATION_NAME" column, and a "LOCATION" column. The Employment Table includes an "EMPID" column and "ORGANIZATION_ID" column, which maps to the Employee Table and the Employer Table. The new schema associated with a new data structure is a single file in Extensible Markup Language (XML) format in a single table cell. Accordingly, a user can provide transformation rules that map the old schema having the three tables to a single file in XML format. In the transformation, an example of a transformation rule may specify removal of certain columns from the tables. Another example of a transformation rule may specify the extraction of column names from the tables for use as XML element names. The following table is an example of a new schema where a table EMPLOYEE_PROFILE is created and with a single column PROFILE, which has all the details in XML file format:

| EMPLOYEE PROFILE |
| --- |
| <xml> |
| <name>A</name> |
| <empid> 1 </empid> |
| <organization_name>AAA</organization_name> |
| <location>CHENNAI</location> |
| </xml> |
| <xml> |
| <name>B</name> |
| <empid> 2 </empid> |
| <organization_name> AAA </organization_name> |
| <location>CHENNAI</location> |
| </xml> |
| <xml> |
| <name>C</name> |
| <empid> 3 </empid> |
| <organization_name>BBB</organization_name> |
| <location>BANGALORE</location> |
| </xml> |
| <xml> |
| <name>D</name> |

| EMPLOYEE PROFILE |
| --- |
| <empid> 4 </empid> |
| <organization_name> BBB </organization_name> |
| <location> BANGALORE </location> |
| </xml> |

After the temporary data structure is transformed to match the new data structure, the metadata from the transformed temporary data structure are copied to the new data structure at 510. With the metadata stored in the new data structure, the metadata from the old data structure are then deleted at 512. The use of the temporary data structure to temporarily hold metadata can be a solution to a restriction by many database systems that old data structures cannot be modified or deleted during operation. Additionally, the temporary data structure allows old versions of the storage management applications to continue to use the old data structure during the update process. As a result, the update process can be applied to one storage server at a time while leaving the non-updated storage servers operational during the update. Such an update process can minimize downtime or disruption to data access operations.

Figure 6:
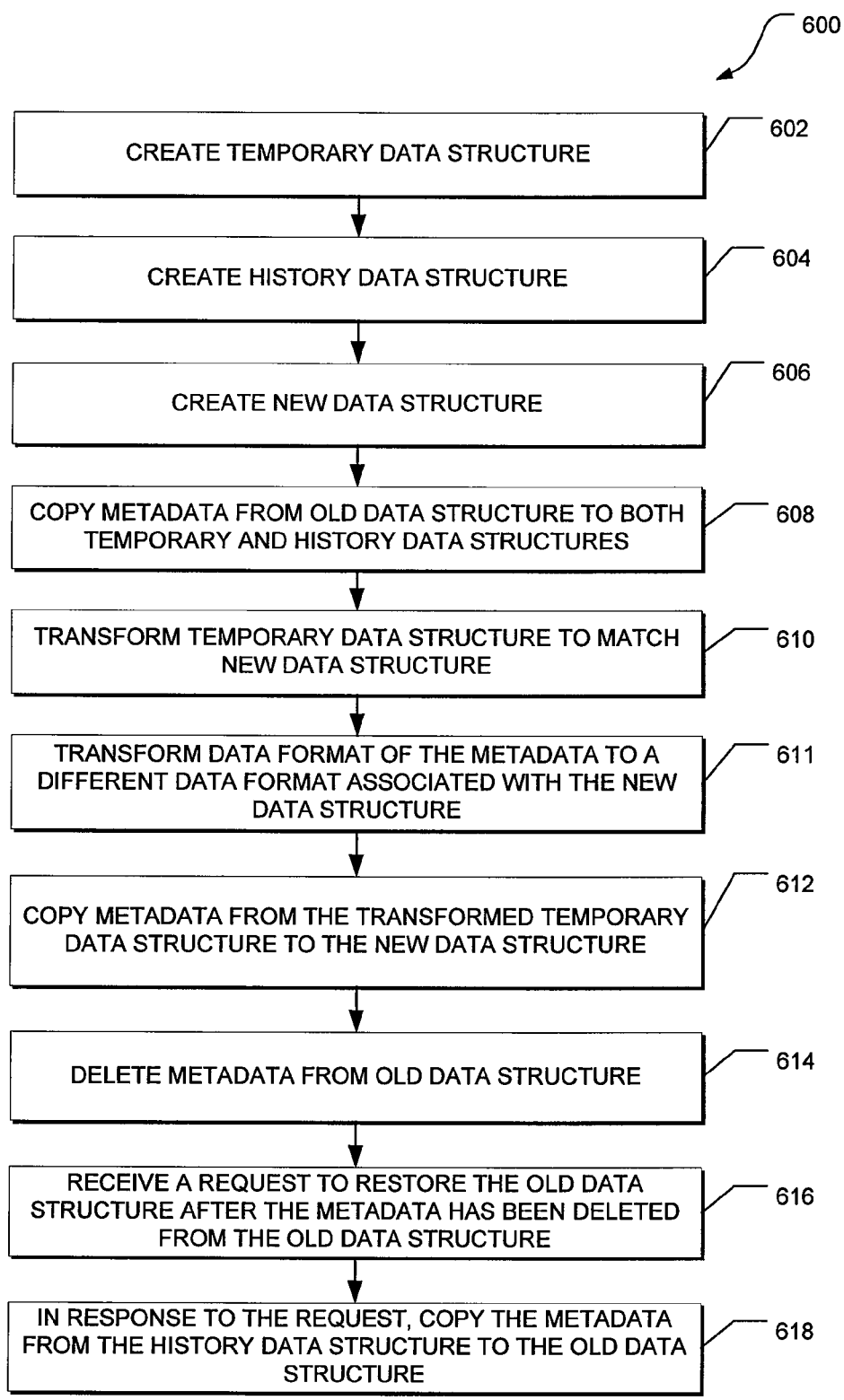
FIG. 6 depicts a flow diagram of a detailed method, in accordance with an alternate embodiment, for updating data structures that store metadata.

FIG. 6 depicts a flow diagram of a detailed method, in accordance with an alternate embodiment, for updating data structures that store metadata. The method 600 may be implemented by the upgrade module 311 and employed in the processing system 300 of FIG. 3. In reference to FIG. 6, a temporary data structure, a history data structure, and a new data structure are created at 602, 604, and 606, respectively. As discussed above, the old data structure refers to an existing data structure that is to be updated. The new data structure is an updated data structure. Similar to the old data structure, the "history" data structure is configured to store metadata from the old data structure, but these metadata in the history data structure are used in reversing the update process. It should be appreciated that a user may want to revert a newly updated storage management application back to an older version. As a result, the old data structure and associated metadata may need to be restored. As explained in more detail below, the reversion process can use the metadata stored in the history data structure to re-create or repopulate the old data structure with associated metadata such that the storage management application and its associated data structures are restored to its pre-updated condition as if the update process has not occurred.

In one embodiment, both the temporary data structure and the history data structures are created with schemas that match the schema associated with the old data structure. Accordingly, the schemas associated with the temporary and history data structures are different from the schema associated with the new data structure. With the data structures created, the metadata from the old data structure are copied to both the temporary data structure and the history data structure at 608. Thereafter, as discussed previously, the temporary data structure is transformed to match the new data structure at 610.

The update process may also update a data format of the metadata. As used herein, a "data format" generally refers to the organization of information according to preset specifications. A data type can be an example of a data format. Another example of a data format is a file format. As such, in this alternate embodiment, a data format of the metadata in the temporary data structure is also transformed at 611 to match a data format associated with the new data structure.

For example, an updated version of a storage management system can be designed to work with floating-point data types. However, an old version of the same storage management system can be designed to work with integer data types. Thus, an example of an update process can transform or convert the data type of the metadata from integer to floating point. In another example, the update process can transform files encoded in MPEG-2 Audio Layer 3 (MP3) format to a different format, such as an MPEG-4 Part 14 (MP4) format.

Still referring to FIG. 6, the transformed metadata are then copied from the transformed temporary data structure to the new data structure at 612. With the metadata transferred to the new data structure, the metadata are then deleted from the old data structure at 614. Accordingly, the update process is complete, and a new, updated version of the storage management application can access its metadata through the new data structure.

After the update, a user may want to revert back to the previous version of the storage management application. In the restoration process, the old data structure and associated metadata are to be restored. In one embodiment, a request to restore the old data at 616 is received after the update process is complete. However, the metadata has been deleted from the old data structure in the update process. Here, the history table can be used in the restoration process. Particularly, in response to the request, the previously stored metadata in the history data structure are copied back to the old data structure at 618. Given that the history data structure was originally created to match the old data structure, the metadata from the history data structure can be directly transferred or copied to the old data structure. With the metadata returned to the old data structure, the old version of the storage management application can then access its metadata from the old data structure.

Figure 7A:
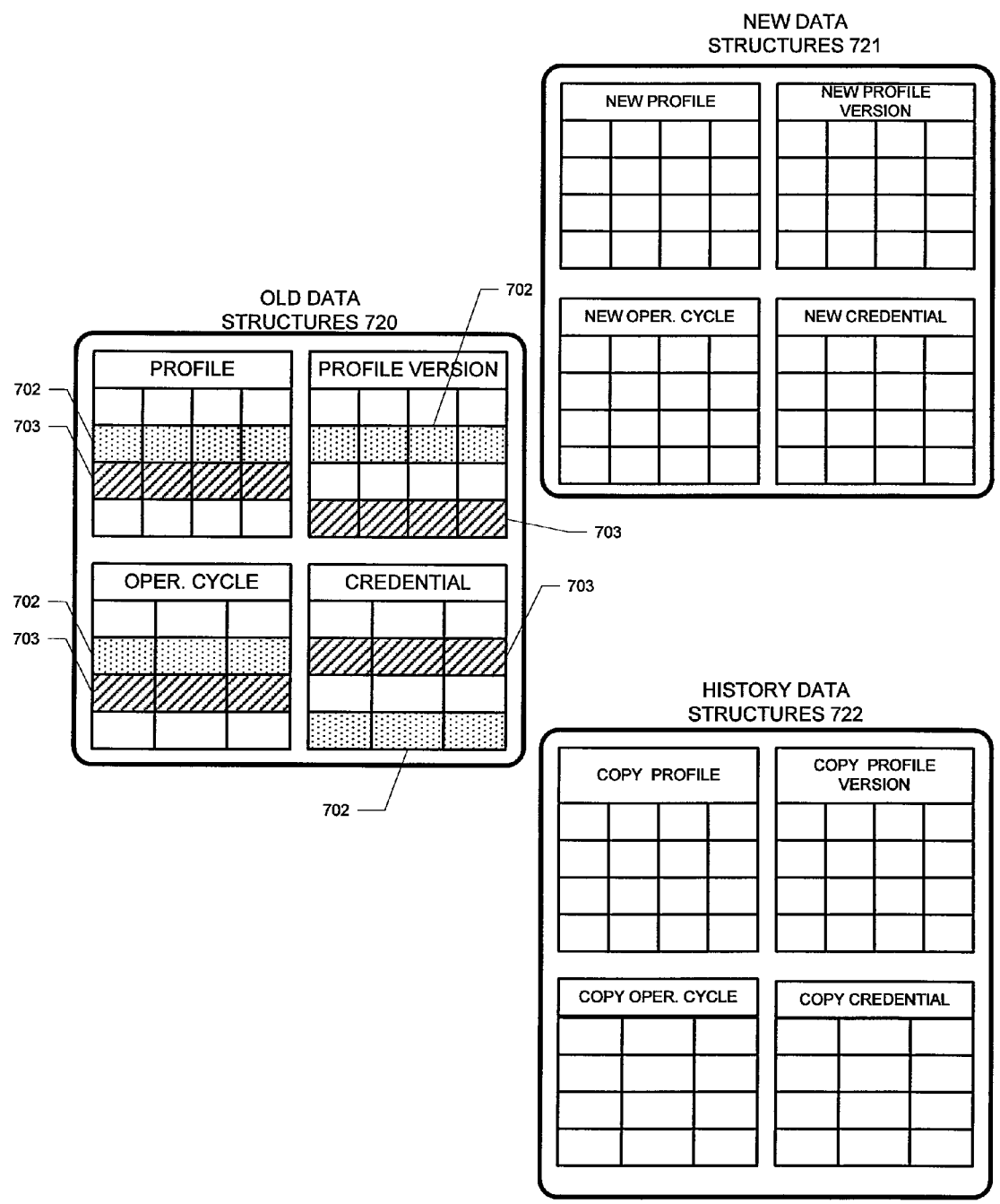
FIGS. 7A, 7B, 7C, and 7D depict diagrams illustrating an example of an update of old data structures configured to store metadata, in accordance with an embodiment of the present invention.

FIGS. 7A-7D depict diagrams illustrating an example of an update of old data structures configured to store metadata, in accordance with an embodiment of the present invention. FIG. 7A depicts a set of old data structures 720, a set of new data structures 721 and a set of history data structures 722. Each data structure 720, 721, or 722 is a set of data elements that is organized using a data structure of vertical columns and horizontal rows. Here, metadata associated with a storage management system are stored in the old data structures 720, which are created in the initial installation process of the storage management system. In this example, the storage management system organizes metadata into profiles. Each profile includes metadata associated with a specific database or specific database system. A profile can reference only one database. The set of old data structures 720 can store metadata associated with multiple profiles. A profile is to be created for every database system that is managed by a storage management system. Once a profile is created for a database system, metadata specific to that database system are stored in the old data structures 720. In the example depicted in FIG. 7A, metadata 702 stored in data elements of old data structures 720 are illustrated with a dotted pattern to identify association with a particular profile ("Profile A"). The other metadata 703 stored in data elements of the same old data structures 720 are illustrated with a hatched pattern to identify association with a different profile ("Profile B").

In the update of the storage management system, the new data structures 721 and the history data structures 722 are created. The history data structures 722 are created with schemas that identically match the schemas associated with the old data structures 720. Given that the old data structures 720 are to be updated, the new data structures 721 are created with schemas that are different from the old data structures 720 (and the history data structures 722).

Figure 7B:
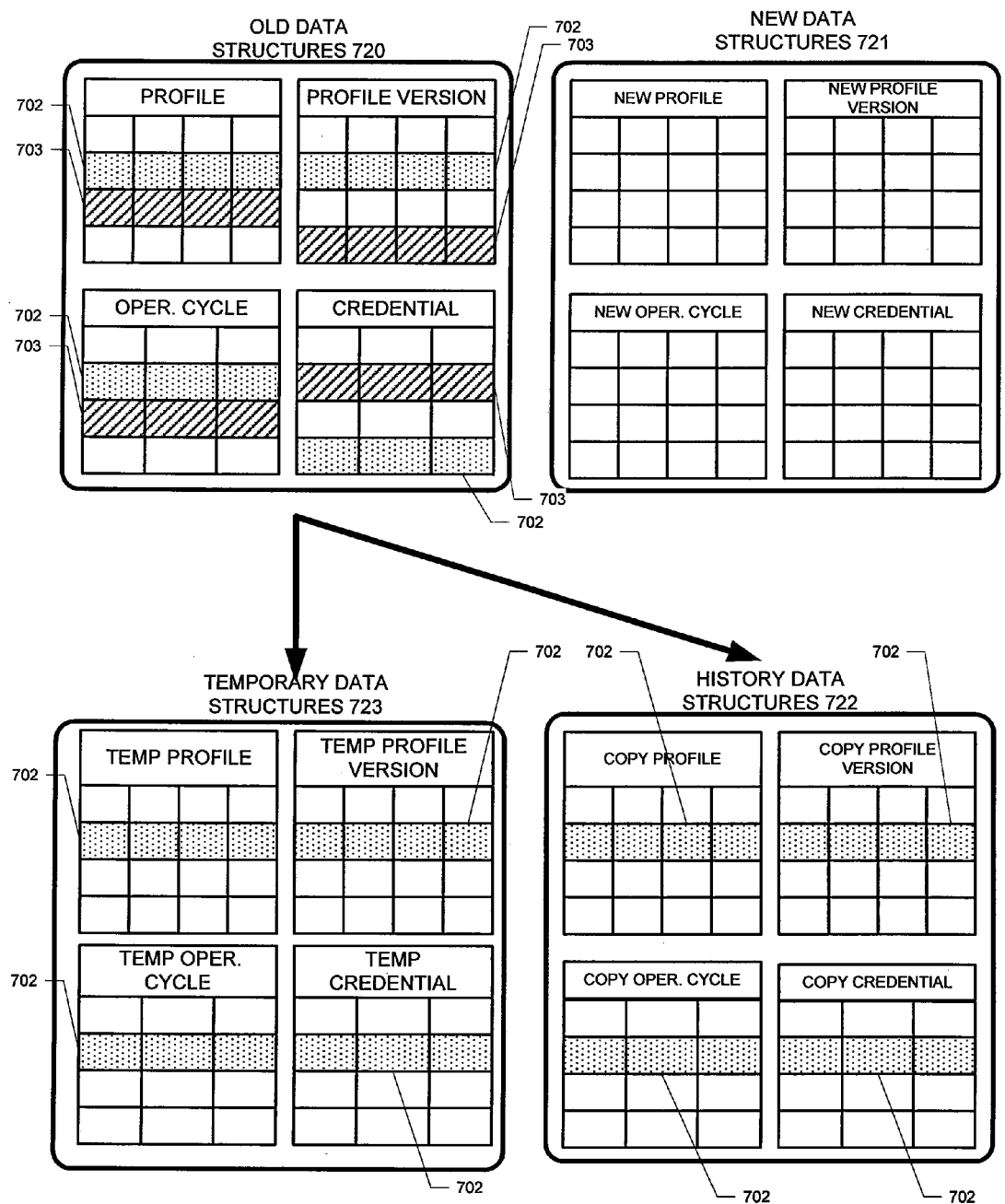

In reference to FIG. 7B, a set of temporary data structures 723 is also created. Initially, the temporary data structures 723 are created with schemas that identically match the schemas associated with the old data structures 720. In this example, the database system associated with Profile A is being updated with a new version of the storage management application. The different database system associated with Profile B is not being updated. Therefore, as illustrated in FIG. 7B, the metadata 702 associated with Profile A are copied from the old data structures 720 to the corresponding data elements of the temporary data structures 723 and history data structures 722 in the update of the old data structures 720 to new data structures 721.

The temporary data structures 723 are then transformed to match the new data structures 721. As discussed above, in one embodiment of the transformation, the schemas of the temporary data structures 723 can be transformed to match the new schemas associated with the new data structures 721. Additionally, in one embodiment, the data format of the metadata 702 stored in the temporary data structures 723 can also be transformed to match a different data format associated with the new data structures 721. After the transformation, as illustrated in FIG. 7C, the transformed metadata 702' stored in the transformed temporary data structures 723' are copied to the new data structures 721.

Figure 7C:
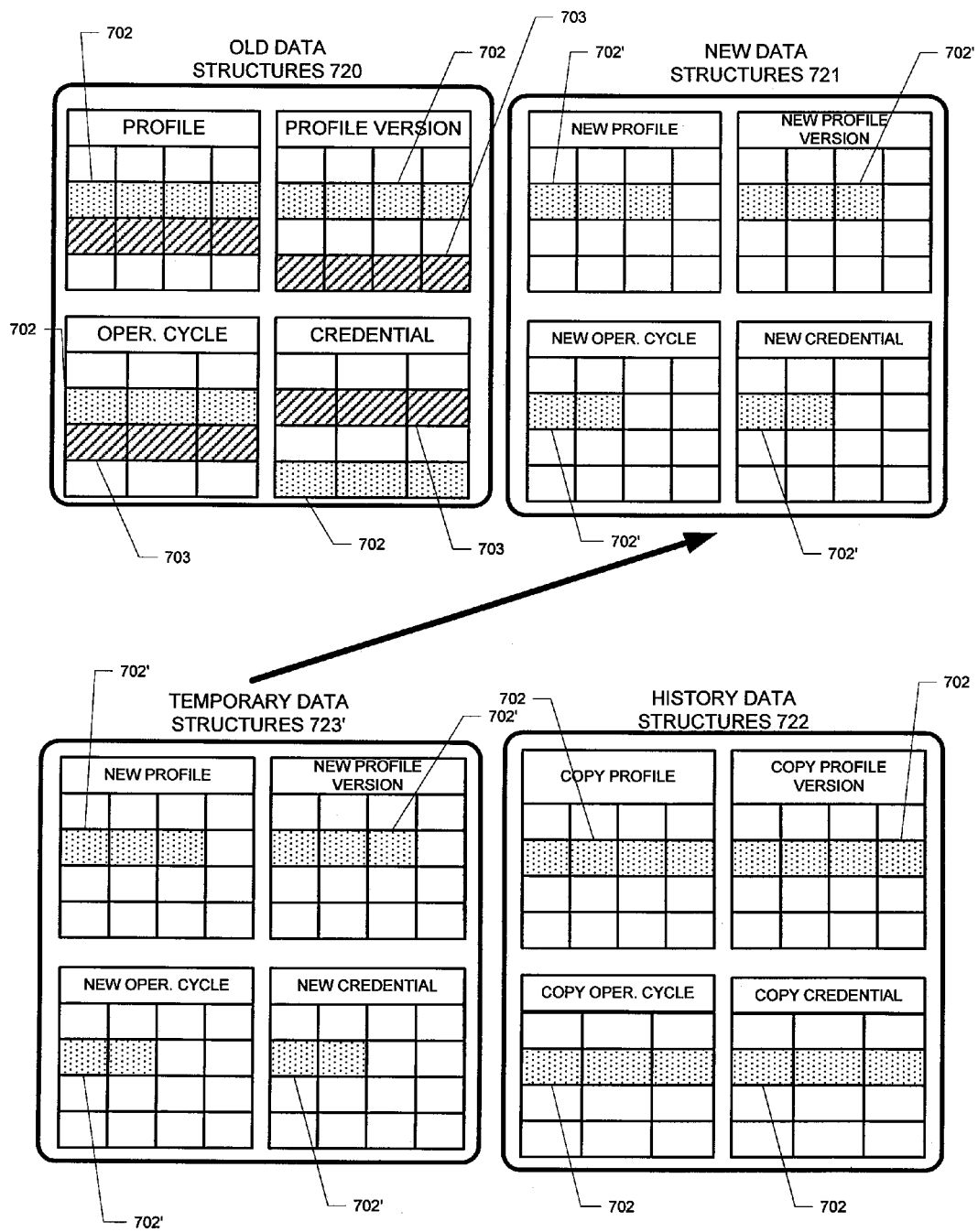
Figure 7D:
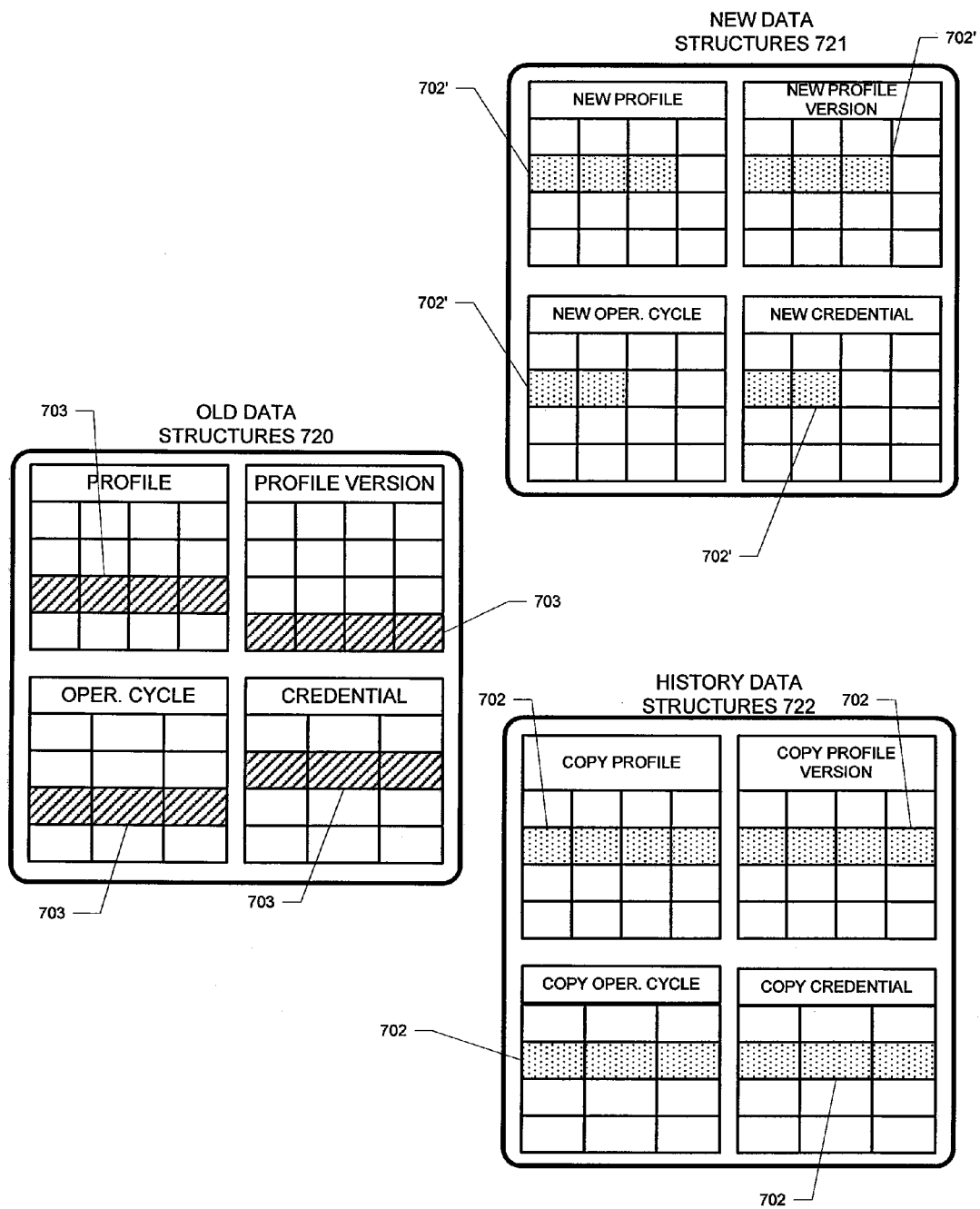

As depicted in FIG. 7D, after the metadata 702' are copied to the new data structures 721, the temporary data structures 723' (as shown in FIG. 7C) are deleted and therefore not illustrated in FIG. 7D. Additionally, the metadata 702 are deleted from the old data structures 720. However, the old data structures 720 are still retained after the metadata 702 have been deleted because, in this example, the different metadata 703 associated with Profile B are still stored in old data structures 720, and such metadata 703 can be continuously accessed by an old version of the storage management application 204 during and after the update process. In one embodiment, the old data structures 720 may be deleted once all the storage management applications have been updated.

Figure 8A:
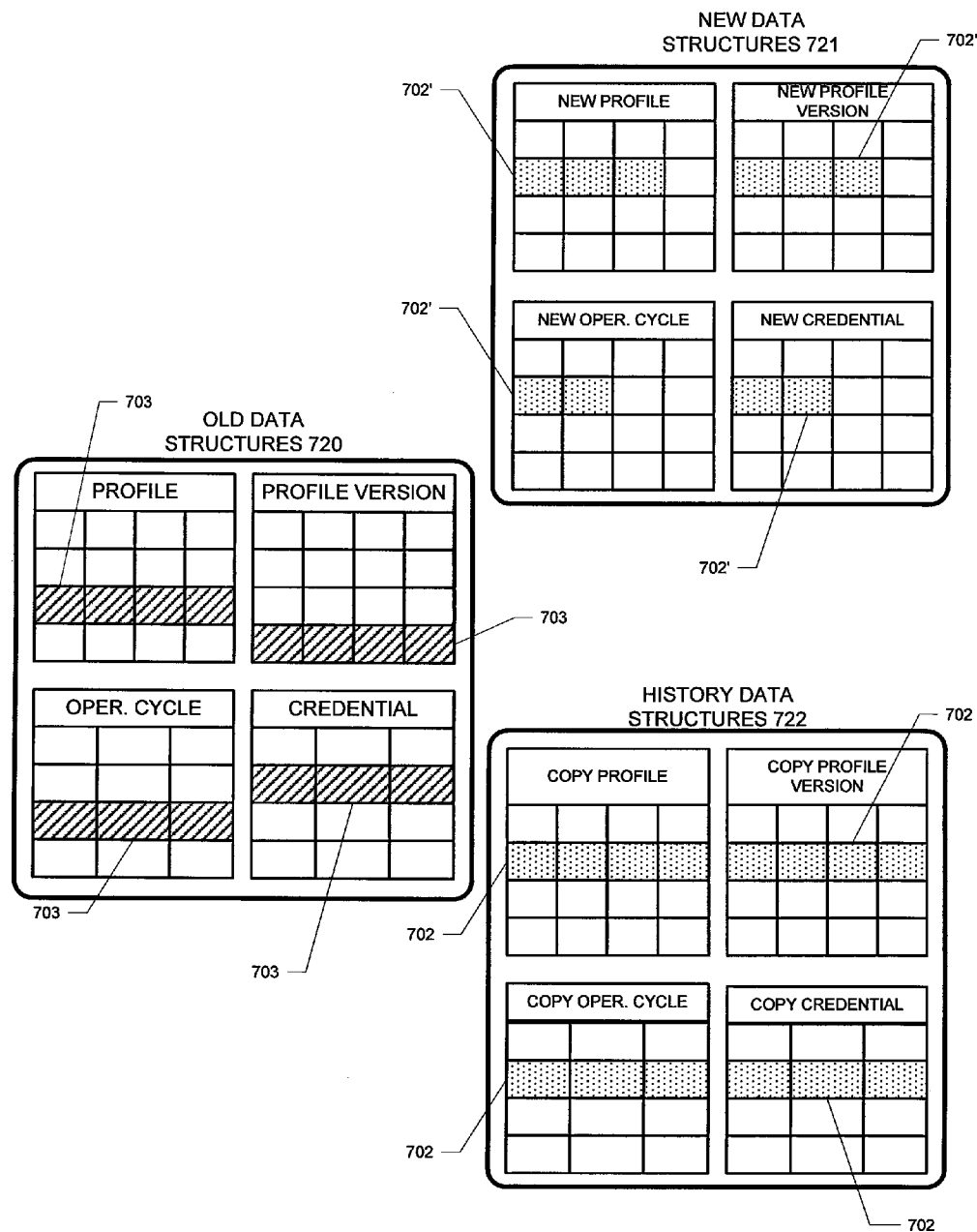
FIGS. 8A, 8B, and 8C depict diagrams illustrating an example of a restoration of the old tables, in accordance with an embodiment of the present invention.
Figure 8B:
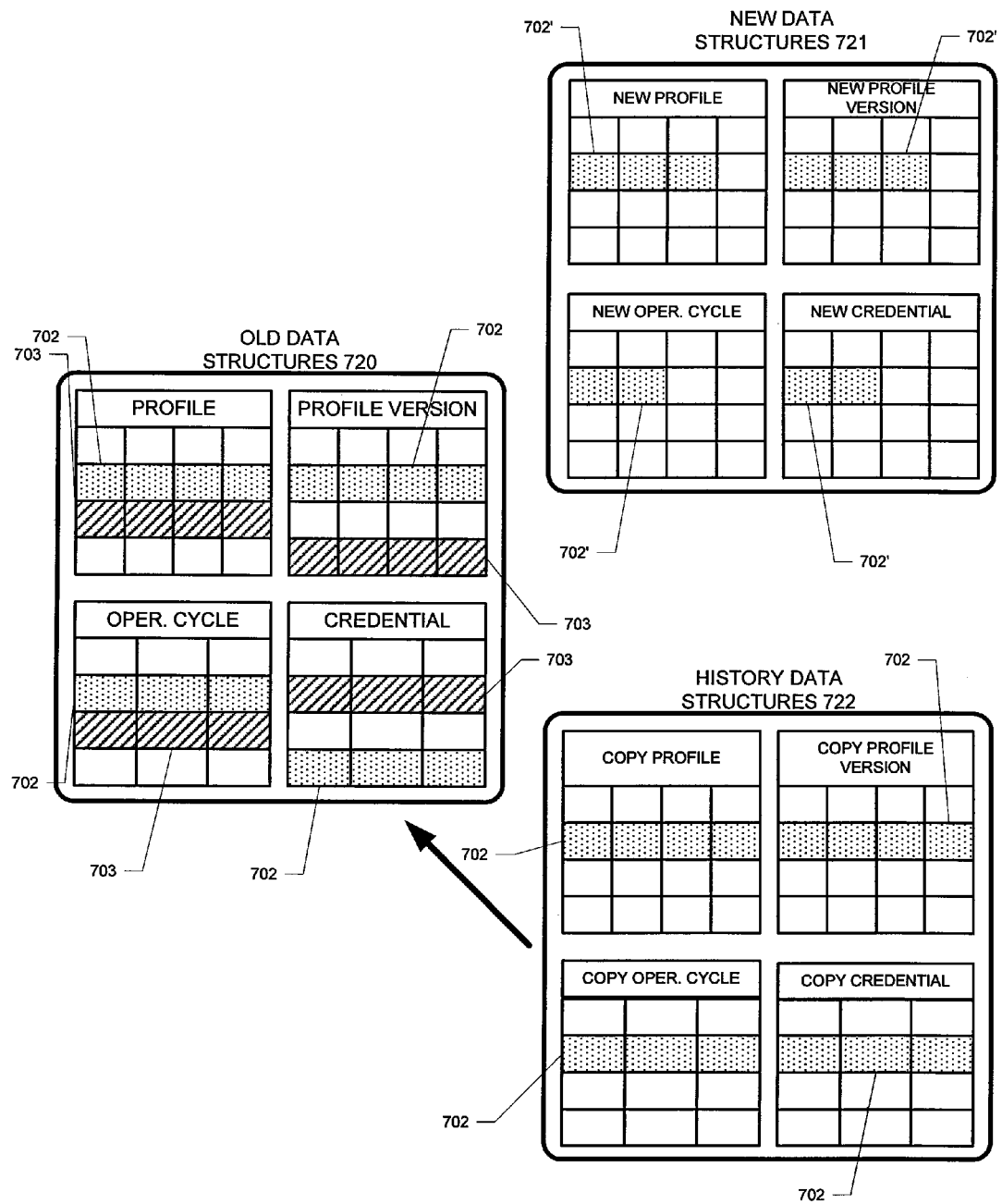
Figure 8C:
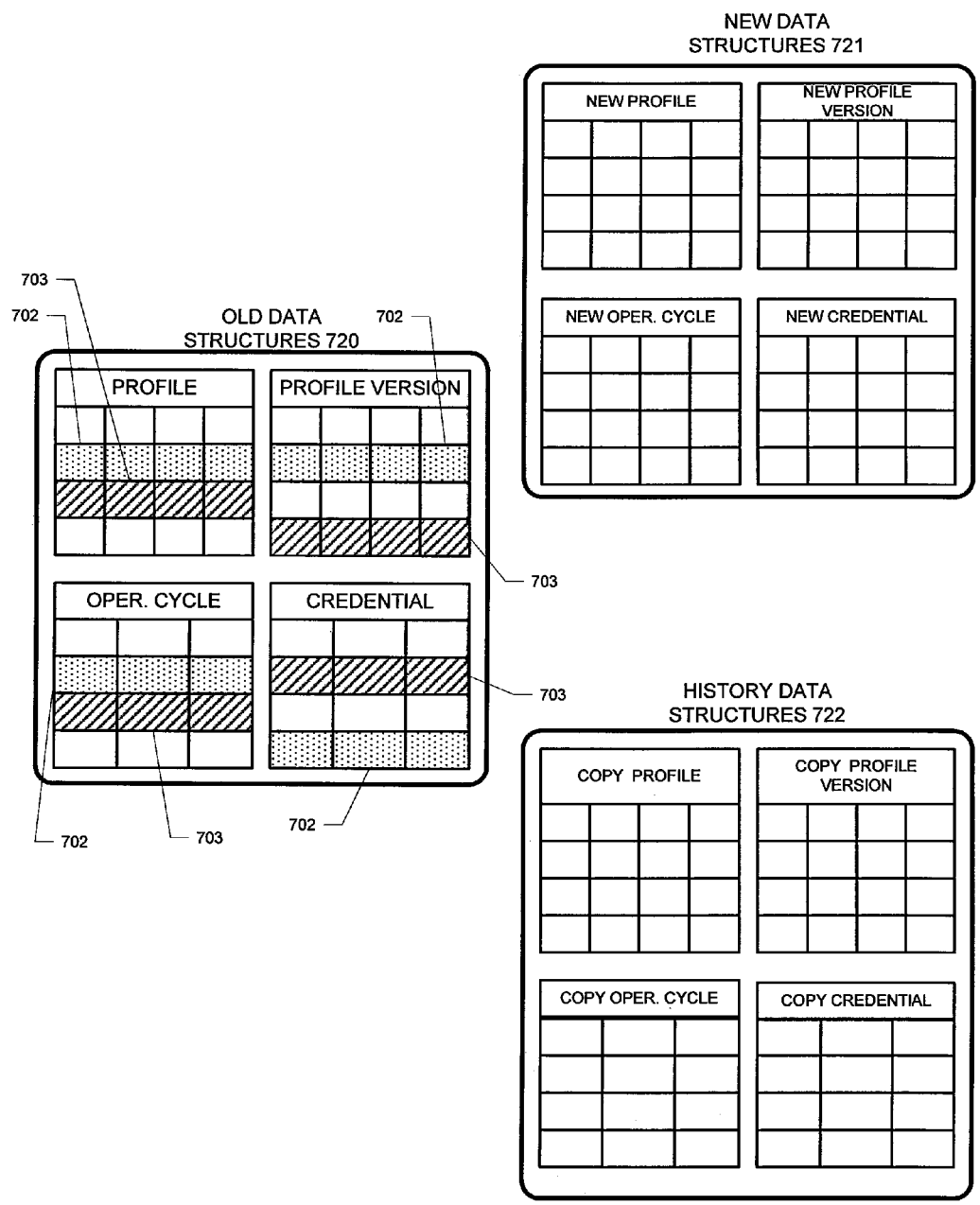

FIGS. 8A-8C depicts diagrams illustrating an example of a restoration of the old data structures, in accordance with an embodiment of the present invention. FIG. 8A depicts a set of old data structures 720, a set of new data structures 721 and a set of history data structures 722. The old data structures 720 have been updated to the new data structures 721, and an updated version of a storage management application is accessing the metadata 702' stored in the new data structures 721. However, a user may decide to undo the update of the storage management application. In returning the storage management application back to the older version, the old data structures 720 with their metadata 702 associated with Profile A, as discussed above, are to be restored. As depicted in FIG. 8B, the metadata 702 associated with Profile A that are stored in history data structures 722 are copied back to the old data structures 720. Given that the history data structures 722 have been created with schemas that are identical to the old data structures 720, the metadata 702 can be directly copied to the old data structures 720.

In reference to FIG. 8C, the metadata 702' and 702 associated with Profile A can be deleted from both the new data structures 721 and the history data structures 722, respectively, after the metadata 702 associated with Profile A are restored back to the old data structures 720. With the old data structures 720 restored, the old version of the storage management application can then access the restored metadata 702. In one embodiment, the new data structures 721 and history data structures 722 may be deleted after the restoration process.

Figure 9:
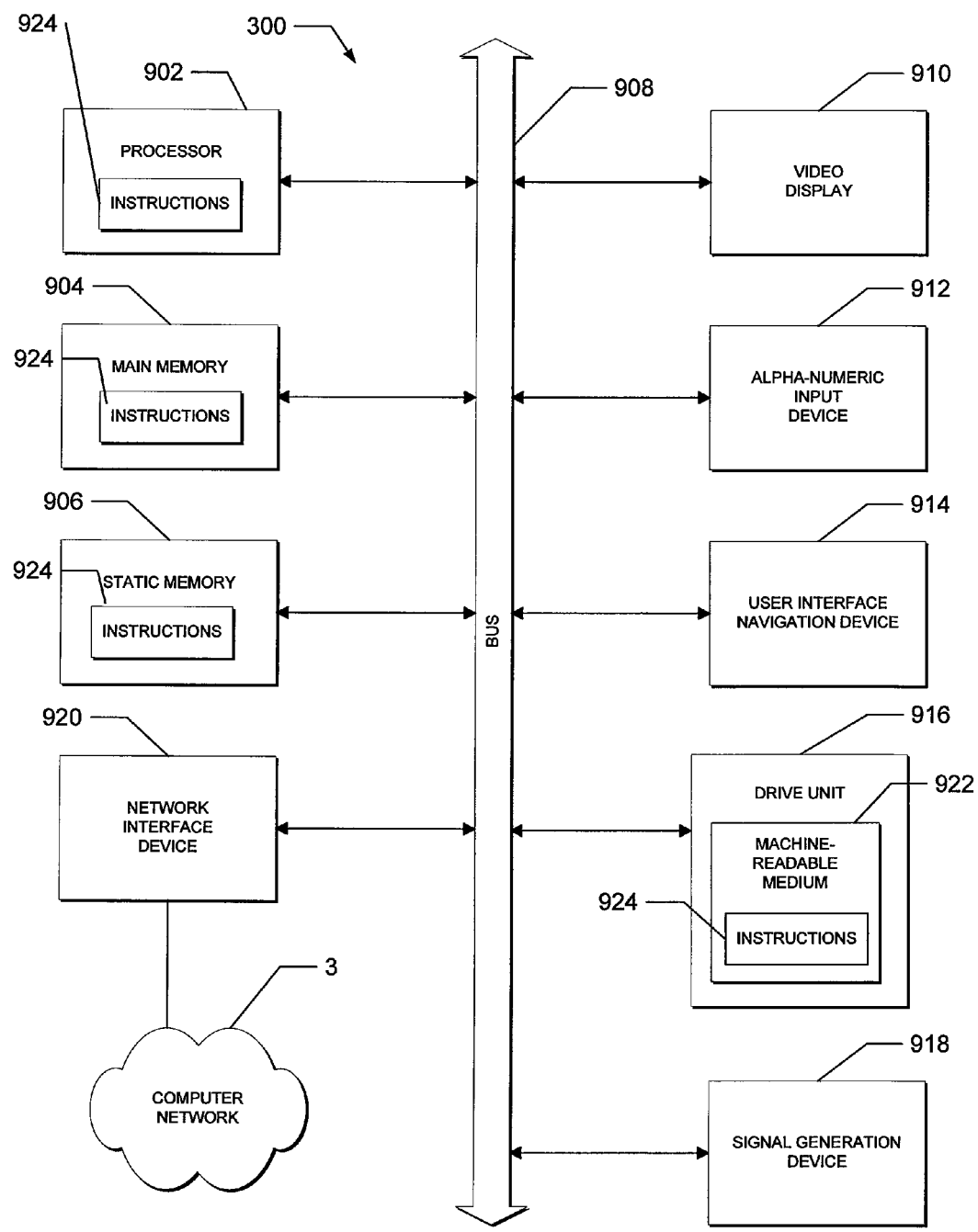
FIG. 9 depicts a hardware block diagram of a machine in the example form of a processing system within which may be executed a set of instructions for causing the machine to perform any one or more of the methodologies discussed herein.

FIG. 9 depicts a hardware block diagram of a machine in the example form of a processing system 300 within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the processing system 300 includes a processor 902 (e.g., a central processing unit (CPU), a graphics processing unit (GPU) or both), a main memory 904 (e.g., random access memory), and static memory 906 (e.g., static random-access memory), which communicate with each other via bus 908. The processing system 300 may further include video display unit 910 (e.g., a plasma display, a liquid crystal display (LCD) or a cathode ray tube (CRT)). The processing system 300 also includes an alphanumeric input device 912 (e.g., a keyboard), a user interface (UI) navigation device 914 (e.g., a mouse), a disk drive unit 916, a signal generation device 918 (e.g., a speaker), and a network interface device 920.

The disk drive unit 916 (a type of non-volatile memory storage) includes a machine-readable medium 922 on which is stored one or more sets of data structures and instructions 924 (e.g., software) embodying or utilized by any one or more of the methodologies or functions described herein. The data structures and instructions 924 may also reside, completely or at least partially, within the main memory 904 and/or within the processor 902 during execution thereof by processing system 300, with the main memory 904 and processor 902 also constituting machine-readable, tangible media.

The data structures and instructions 924 may further be transmitted or received over a computer network 3 via network interface device 920 utilizing any one of a number of well-known transfer protocols (e.g., HyperText Transfer Protocol (HTTP)).

Certain embodiments are described herein as including logic or a number of components, modules, or mechanisms. Modules may constitute software modules (e.g., code embodied on a machine-readable medium or in a transmission signal) and/or hardware modules. A hardware module is a tangible unit capable of performing certain operations and may be configured or arranged in a certain manner. In example embodiments, one or more computer systems (e.g., the processing system 300) or one or more hardware modules of a computer system (e.g., a processor 902 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor 902 or other programmable processor) that is temporarily configured by software to perform certain operations. It will be appreciated that the decision to implement a hardware module mechanically, in dedicated and permanently configured circuitry, or in temporarily configured circuitry (e.g., configured by software), may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 902 configured using software, the general-purpose processor 902 may be configured as respective different hardware modules at different times. Software may accordingly configure a processor 902, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation, and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors 902 that are temporarily configured (e.g., by software) or permanently configured to perform the relevant operations. Whether temporarily or permanently configured, such processors 902 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 902 or processor-implemented modules. The performance of certain of the operations may be distributed among the one or more processors 902, not only residing within a single machine, but deployed across a number of machines. In some example embodiments, the processors 902 may be located in a single location (e.g., within a home environment, an office environment or as a server farm), while in other embodiments the processors 902 may be distributed across a number of locations.

While the embodiment(s) is (are) described with reference to various implementations and exploitations, it will be understood that these embodiments are illustrative and that the scope of the embodiment(s) is not limited to them. In general, techniques for updating data structures may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

The invention claimed is:

1. A method performed by a processor, comprising:
creating a temporary data structure in a storage device;
creating a new data structure representing an update of an old data structure in the storage device configured to store metadata associated with a plurality of database systems having an application that is not being updated and a new version of the application as part of the update;
copying the metadata from the old data structure to the temporary data structure;
transforming the temporary data structure to match the new data structure enabling the application not being updated to be operational and to access the old data structure during the update;
copying the metadata from the transformed temporary data structure to the new data structure to enable the new version of the application to access the new data structure after the metadata is copied; and
deleting the metadata from the old data structure.

2. The method of claim 1, wherein transforming the temporary data structure includes transforming a data format of the metadata stored in the temporary data structure to match a data format associated with the new data structure.

3. The method of claim 1, wherein the old data structure has an old schema, and wherein the new data structure has a new schema that is different than the old schema.

4. The method of claim 3, wherein creating the temporary data structure includes creating the temporary data structure with a schema that matches the old schema of the old data structure.

5. The method of claim 4, wherein transforming the temporary data structure includes transforming the schema that matches the old schema of the old data structure to match the new schema of the new data structure.

6. The method of claim 5, wherein transforming the schema that matches the old schema of the old data structure to match the new schema of the new data structure includes (i) receiving one or more transformation rules from a user, and (ii) using the one or more transformation rules to map the schema that matches the old schema of the old data structure to the new schema of the new data structure.

7. The method of claim 1, wherein the metadata comprises at least one of a time of a creation of a backup, a file name, a credential, or data about operations performed.

8. A non-transitory computer-readable medium storing instructions that, when executed by a processor, cause the processor to perform operations comprising:
creating a temporary data structure in a storage device;
creating a new data structure representing an update of an old data structure in the storage device, the old data structure storing metadata associated with a plurality of database systems having an application that is not being updated and a new version of the application that is part of the update;
copying the metadata from the old data structure to the temporary data structure;
transforming the temporary data structure to match the new data structure enabling the application not being updated to be operational and to access the old data structure during the update;
copying the metadata from the transformed temporary data structure to the new data structure to enable the new version of the application to access the new data structure after the metadata is copied; and
deleting the metadata from the old data structure.

9. The non-transitory computer-readable medium of claim 8, wherein the instructions cause the processor to transform the temporary data structure by transforming a data format of the metadata stored in the temporary data structure to match a data format associated with the new data structure.

10. The non-transitory computer-readable medium of claim 8, wherein the old data structure has an old schema, and wherein the new data structure has a new schema that is different than the old schema.

11. The non-transitory computer-readable medium of claim 10, wherein the instructions cause the processor to create the temporary data structure by creating the temporary data structure with a schema that matches the old schema of the old data structure.

12. The non-transitory computer-readable medium of claim 11, wherein the instructions cause the processor to transform the temporary data structure by transforming the schema that matches the old schema of the old data structure to match the new schema of the new data structure.

13. The non-transitory computer-readable medium of claim 12, wherein the instructions cause the processor to transform the schema that matches the old schema of the old data structure to match the new schema of the new data structure by (i) receiving one or more transformation rules from a user, and (ii) using the one or more transformation rules to map the schema that matches the old schema of the old data structure to the new schema of the new data structure.

14. The non-transitory computer-readable medium of claim 8, wherein the metadata comprises at least one of a time of a creation of a backup, a file name, a credential, or data about operations performed.

15. A system comprising:
a processor; and
a memory coupled to the processor, the memory storing instructions that, when executed by the processor, cause the processor to:
create a temporary data structure in a storage device;
create a new data structure representing an update of an old data structure in the storage device, the old data structure storing metadata associated with a plurality of database systems having an application that is not being updated and a new version of the application that is part of the update;
copy the metadata from the old data structure to the temporary data structure;
transform the temporary data structure to match the new data structure enabling the application not being updated to be operational and to access the old data structure during the update;

copy the metadata from the transformed temporary data structure to the new data structure to enable the new version of the application to access the new data structure after the metadata is copied; and delete the metadata from the old data structure.

16. The system of claim 15, wherein the instructions cause the processor to transform the temporary data structure by transforming a data format of the metadata stored in the temporary data structure to match a data format associated with the new data structure.

17. The system of claim 15, wherein the old data structure has an old schema, and wherein the new data structure has a new schema that is different than the old schema, and wherein the instructions cause the processor to create the temporary data structure by creating the temporary data structure with a schema that matches the old schema of the old data structure.

18. The system of claim 17, wherein the instructions cause the processor to transform the temporary data structure by transforming the schema that matches the old schema of the old data structure to match the new schema of the new data structure.

19. The system of claim 18, wherein the instructions cause the processor to transform the schema that matches the old schema of the old data structure to match the new schema of the new data structure by (i) receiving one or more transformation rules from a user, and (ii) using the one or more transformation rules to map the schema that matches the old schema of the old data structure to the new schema of the new data structure.

20. The system of claim 15, wherein the metadata comprises at least one of a time of a creation of a backup, a file name, a credential, or data about operations performed.

* * * * *